June 23, 1970     R. P. HAHN     3,516,697
CONNECTOR FOR TUBULAR MEMBERS
Filed Feb. 20, 1969
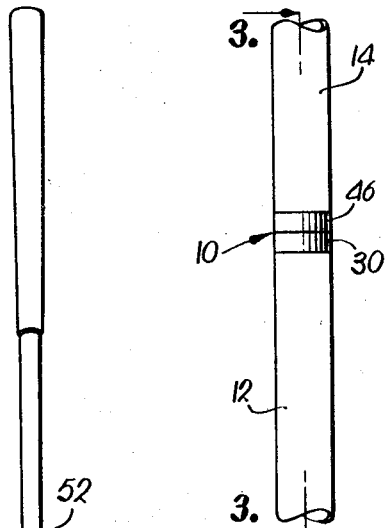
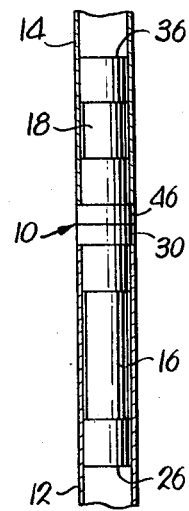
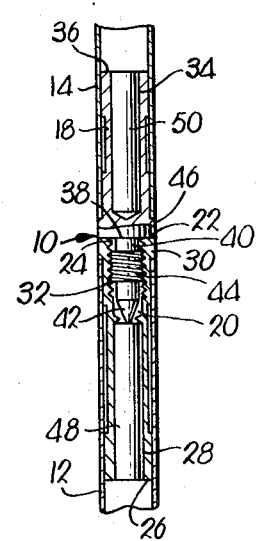
Fig.1.    Fig.2.    Fig.3.
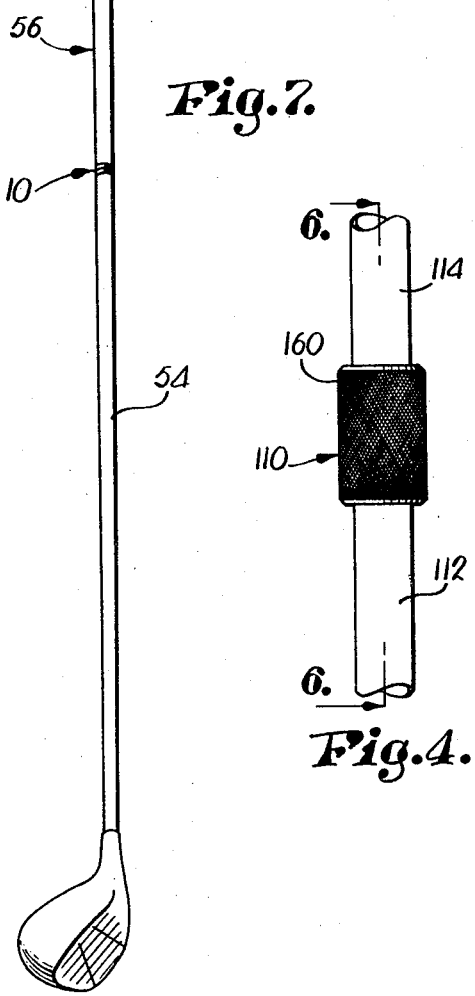
Fig.7.
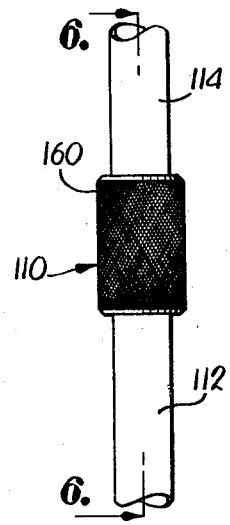
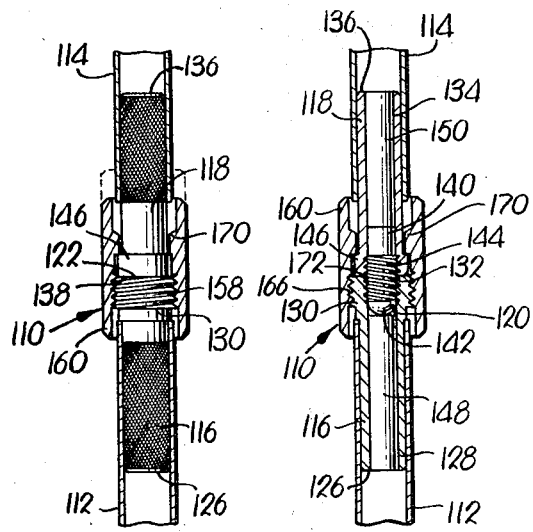
Fig.4.    Fig.5.    Fig.6.
INVENTOR
Raymond P. Hahn
BY *Schmidt, Johnson, Hovey,
Williams & Chase.*
ATTORNEYS.

2

United States Patent Office 3,516,697
Patented June 23, 1970

3,516,697
CONNECTOR FOR TUBULAR MEMBERS
Raymond P. Hahn, Leawood, Kans., assignor to Raymar, Inc., Leawood, Kans., a corporation of Kansas
Filed Feb. 20, 1969, Ser. No. 800,840
Int. Cl. F16b 7/00
U.S. Cl. 287—125                             6 Claims

ABSTRACT OF THE DISCLOSURE

A connector for joining a pair of tubular members in end to end relationship with the connector including a pair of interengaging threaded units, each unit having a magnetic element which attracts the element of the opposing member to aid in retaining the units in engagement. A second embodiment of the connector includes a locking sleeve exteriorly of the units to hold said members against relative movement until the sleeve is released.

---

The present invention relates to coupling assemblies and, more particularly, to a connector for joining tubular members.

The present invention has a number of practical uses, but it is particularly well suited for joining shafting such as that used in the construction of golf clubs. Presently, the length of club shafts and the weight of a full set of clubs create handling and storage problems during transportation of the clubs which become especially acute when space is at a premium, as when traveling by commercial carriers.

Accordingly, it is an important object of my present invention to provide a connector for releasably joining a pair of tubular members such as sections of a golf club shaft whereby the club may be disassembled to save space and facilitate transportation.

It is a further important object of my invention to provide a connector which permits construction of a set of golf clubs having a single upper shaft section which is interchangeable between several lower shaft sections such that a set of clubs is presented which is compact and relatively light in weight.

Another important object of my invention is the provision of a connector for tubular members having a magnetic element in each of its interengaging units, the elements cooperating to pull the units together to provide a safe, strong connection of the members.

A further important object of my invention is the provision of a releasable locking sleeve on the connector which holds the members against relative movement so that the junction may not accidentally become loosened.

In the drawing:

FIG. 1 is a fragmentary, elevational view of a pair of tubular members joined by one form of connector;

FIG. 2 is a view similar to FIG. 1 with the members shown in section;

FIG. 3 is a cross-sectional view taken along line 3—3 of FIG. 1;

FIG. 4 is a fragmentary, elevational view of a pair of tubular members joined by a second form of connector having a locking sleeve;

FIG. 5 is a view similar to FIG. 4 showing the members and the locking sleeve in section with the release position for the sleeve shown in phantom;

FIG. 6 is a cross-sectional view taken along line 6—6 of FIG. 4; and

FIG. 7 is a view of a golf club having a separable shaft which is joined by a connector embodying the principles of my instant invention.

The first form of connector is denoted generally by the numeral 10 and is shown in FIG. 1 joining a pair of tubular members 12 and 14. The connector 10 includes a pair of elongated units 16 and 18 with unit 16 having a cavity 20 formed in one end 22 presenting a mouth 24. The inner walls of cavity 20 are formed in a series of left-hand threads 32. Extending inwardly from the opposite end 26 of unit 16 is an elongated inner bore 28 formed substantially centrally of the unit 16.

The outer diameter of unit 16 is relatively the same size as the inner diameter of tubular member 12, such that the unit 16 is firmly gripped by the member 12 when the connector 10 is in use. An enlargement 30 at end 22 provides means for positioning the unit 16 within the member 12.

The unit 18 has an elongated inner bore 34 extending substantially centrally from one end 36. At the opposite end 38 of unit 18 is an elongated protuberance 40 extending outwardly from end 38 and presenting a tapered terminus 42. The protuberance 40 carries a series of mating left-hand threads 44 for threads 32 in the cavity 20. As with unit 16, the outer diameter of unit 18 is substantially the same size as the inner diameter of tubular member 14 such that unit 18 is firmly gripped by the walls of member 14. Likewise, a shoulder 46 at end 38 abuts the leading end of member 14 such that shoulder 46 extends outwardly beyond member 14.

A pair of cylindrical magnetic elements 48 and 50 are designed to be placed within the inner bores 28 and 34 respectively to aid in pulling together units 16 and 18 and, when they are in engagement with one another, to maintain a strong junction of the members 12 and 14.

In use the connector 10 provides safe, sure means for joining a variety of tubular members in various situations. In particular, it is well suited for joining sections of tubular shafting such as found in most golf clubs. The connector 10 makes it possible to provide a set of clubs which is substantially lighter in weight and takes up less space than an ordinary full set of clubs by eliminating some unnecessary shafting. Since the upper portions of the golf clubs including the grip areas are identical in each club, an easily transportable set of clubs is provided by making a single upper gripping section 52 which is interchangeable with a number of lower sections 54 as illustrated by the club 56 in FIG. 7.

Accordingly, an upper section 52 should be tightly fitted with a unit 18 which is disposed so that shoulder 46 extends beyond the open end of section 52 and protuberance 40 projects outwardly therefrom. Each of the sections 54 should be tightly fitted with a unit 16 so that the enlargement 30 extends beyond the open end of the section 54.

Then, any of the lower sections 54 may be prepared for use by inserting protuberance 40 into cavity 20 and rotating section 52 in a counterclockwise direction as viewed in FIG. 7 to engage the mating threads 32 and 44. Section 52 should be rotated until enlargement 30 and shoulder 46 abut one another.

It will be noted that due to the left-hand nature of threads 32 and 44, sections 52 and 54 tend to tighten their engagement as the club 56 is swung so that the danger of sections 52 and 54 becoming loosened is relatively slight. Additionally, the attraction of the magnetic elements 48 and 50 for one another aids in keeping the sections 52 and 54 together.

FIGS. 4 through 6 illustrate a second form of connector. In said form, a pair of tubular members 112 and 114 are joined by a connector 110 having a pair of interengaging units 116 and 118. The unit 116 is likewise provided with a cavity 120 formed in one end 122 which has a series of left-hand threads 132 in its inner walls and presents an open mouth 124 at the same end 122. The mouth 124 is provided with a chamfered rim 172. Also, an inner bore 128 extends inwardly from the opposite end 126 of the unit 116 and receives a magnetic element 148 which assists in holding the units 116 and 118 in engagement.

Unit 118 has an inner bore 134 extending inwardly from one end 136 and presents a protuberance 140 extending outwardly from the opposite end 138. The protuberance 140 presents a rounded terminus 142 and carries a series of mating threads 144 for threads 132. A magnetic element 150 is positioned within the bore 134 to attract element 148 and provide added strength when the units 116 and 118 are joined.

Lock means including a hollow sleeve 160 are provided to restrain relative movement between members 112 and 114 after they have become joined. A series of right-hand threads 158 are formed exteriorly of unit 116 on enlargement 130 at end 122, and a shoulder 146 is disposed at end 138. A series of right-hand mating threads 166 for threads 158 and stop means in the nature of a rib 170 spaced from the threads 166 are formed interiorly of sleeve 160. The outer surfaces of units 116 and 118 as well as the outer surface of sleeve 160 are roughened to present effective gripping surfaces.

In use the sleeve 160 must be positioned around the member 114 prior to engaging the units 116 and 118. When protuberance 140 has become secured within the cavity 120 by engaging the threads 132 and 144 and enlargement 130 has been brought into abutting relation with shoulder 146, the sleeve 160 should be moved from its released position shown by the phantom lines in FIG. 5 to its locking position as illustrated by the solid lines in the same figure. Rotating the sleeve 160 in a clockwise direction as viewed in FIG. 5 causes threads 158 and 156 to engage, and the rib 170 is drawn into abutting relation with the shoulder 146. With the rib 170 in such position, the units 116 and 118 are locked against relative movement until the sleeve 160 is rotated in the opposite direction to release its grip.

Having thus described the invention, what is claimed as new and desired to be secured by Letters Patent is:

1. A connector for tubular members comprising;
   a first unit having a cavity formed in one end;
   a second unit having a protuberance extending outwardly from one end whereby said units may be joined by engaging said protuberance in the cavity;
   means for releasably retaining said units in engagement;
   said means including a series of threads in the inner wall of said cavity, a series of mating threads in the outer surface of said protuberance and a magnet secured within a bore in each of said units behind said cavity and protuberance; and
   means for securing each of said units in a corresponding tubular member.

2. The invention of claim 1, said threads being left-handed in formation.

3. The invention of claim 2, said cavity presenting a mouth having a chamfered rim.

4. The invention of claim 2, and lock means exteriorly of said units for releasably holding the latter against relative movement.

5. The invention of claim 4,
   said lock means having parts on each unit,
      the part on said first unit being a threaded enlargement at said one end,
      the parts on said second unit including a shoulder at said one end and a shiftable sleeve having mating interior threads for those on the first unit with stop means for engaging said shoulder.

6. The invention of claim 5, the exterior surfaces of said units being irregular to provide effective gripping areas.

References Cited

UNITED STATES PATENTS

| | | | |
|---|---|---|---|
| 1,565,070 | 12/1925 | Edwards | 287—125 XR |
| 2,463,053 | 3/1949 | Pritchard | 273—80.1 |
| 2,697,642 | 12/1954 | Rudy. | |

FOREIGN PATENTS 946 11/1914 Great Britain.

REINALDO P. MACHADO, Primary Examiner

A. V. KUNDRAT, Assistant Examiner

U.S. Cl. X.R.

273—80; 287—116